United States Patent [19]

Fuentes

[11] Patent Number: 5,657,003
[45] Date of Patent: Aug. 12, 1997

[54] STRUCTURE MOVEMENT MONITORING AND EMERGENCY ALARM SYSTEM

[76] Inventor: Alfredo Fuentes, 66 Forester St., Long Beach, N.Y. 11561

[21] Appl. No.: 606,922

[22] Filed: Feb. 26, 1996

[51] Int. Cl.$^6$ .................................................. G08B 21/00
[52] U.S. Cl. .................... 340/690; 340/686; 340/689; 348/125; 348/128; 348/130
[58] Field of Search .................... 340/540, 557, 340/686, 689, 690; 348/125, 128, 129, 130; 382/107, 141; 356/373, 375

[56] References Cited

U.S. PATENT DOCUMENTS

| | | | |
|---|---|---|---|
| 3,711,846 | 1/1973 | Schlisser et al. | 340/258 B |
| 4,480,480 | 11/1984 | Scott et al. | 364/508 |
| 4,843,372 | 6/1989 | Savino | 340/540 |
| 4,889,997 | 12/1989 | Tomiolo | 250/561 |
| 4,952,911 | 8/1990 | D'Ambrosia et al. | 340/557 |
| 5,112,130 | 5/1992 | Isawa | 356/373 |
| 5,280,542 | 1/1994 | Ozeki et al. | 340/686 |
| 5,289,434 | 2/1994 | Berni | 367/178 |
| 5,404,132 | 4/1995 | Cantry et al. | 340/686 |

*Primary Examiner*—Jeffery Hofsass
*Assistant Examiner*—Mark S. Rushing
*Attorney, Agent, or Firm*—John Gugliotta; David Volk

[57] ABSTRACT

A structure movement monitoring and emergency alarm system is disclosed utilizing a convention surveyor's laser transit. The transit is leveled and positioned to "shoot" across a structure that requires emergency monitoring, such as a building wall. The vertical reference position being established by the light beam, a video camera system is utilized to maintain a real-time image of the monitored area through the telescope of the transit. Using a computer for comparing, monitoring, and alarming, this visual image is digitized and referenced with a comparison grid. At regular intervals, a new visual image is compared to the reference grid to determine the location of the structure, as well as any relative movement from the reference position. Audio and visual alarms can then be activated immediately upon the determination that the position of the monitored structure has changed past acceptable limits.

12 Claims, 4 Drawing Sheets

STRUCTURE MOVEMENT MONITORING AND EMERGENCY ALARM SYSTEM

BACKGROUND OF THE INVENTION

1. Field of the Invention

The present invention relates generally to structure monitors, and, more particularly, to a portable device for monitoring structures for movement, especially in emergency or damage situations, and alarming persons in the vicinity of impending danger or structure collapse.

2. Description of the Related Art

In the related art, many methods of monitoring structures, such as walls, roofs, or bridges, for motion or structural deflection are known. For example, in U.S. Pat. No. 5,404,132, issued in the name of Canty et al., a deflection monitoring system is disclosed utilizing a series of laser beams at the perimeter of a support structure for the effects of external stress factors. Deflection in a support structure is registered when the path of the beams between the laser and a receiver is broken, hopefully by a deflection in the monitored structure.

Also known is U.S. Pat. No. 5,289,434, issued in the name of Berni, in which a retro reflector apparatus for remote seismic sensing is disclosed in which a polarizing beam splitter splits a sensing laser beam so as to be later compared for differences in vertical seismic motion at a remote site.

Another illustration of the related art appears in U.S. Pat. No. 4,899,997, issued in the name of Tomiolo, wherein a process and device for measuring and processing the displacements between two or more points in structures, buildings, machinery or the like is disclosed. Once again, a laser ray directed toward a number of targets is utilized with this process and device.

And finally, in U.S. Pat. No. 4,843,372, issued in the name of Savino, a bridge sway and deflection detection system is disclosed which once again utilizes a laser gun and a receiver, in conjunction with a mirror system and a plurality of aperture plates in order to monitor and detect for swaying and deflection in a bridge.

Although many of these related disclosure can be adapted to monitor the motion of structures, none can provide a portable device for monitoring structures for movement, especially in emergency or damage situations, and alarming persons in the vicinity of impending danger or structure collapse. Nor can any of these related disclosure provide the precision and reliability of computer monitoring and image comparison. Consequently, a need has been felt for providing an apparatus and method which overcome the problems associated with manually monitoring a damaged structure in danger of collapsing, without the limitations of a permanently installed system.

SUMMARY OF THE INVENTION

It is therefore an object of the present invention to provide an improved structure monitor.

It is another object of the present invention to provide an improved structure movement monitoring and emergency alarm system.

It is a feature of the present invention to provide an improved structure movement monitoring and emergency alarm system which is portably installable at a rescue site.

Briefly described according to the preferred embodiment of the present invention, a structure movement monitoring and emergency alarm system is disclosed utilizing a convention surveyor's laser transit. The transit is leveled and position to "shoot" across a structure that requires emergency monitoring, such as a building wall. The vertical reference position being established by the light beam, a video camera system is utilized to maintain a real-time image of the monitored area through the telescope of the transit. Using a computer for comparing, monitoring, and alarming, this visual image is digitized and referenced with a comparison grid. At regular intervals, a new visual image is compared to the reference grid to determine the location of the structure, any relative movement from the reference position, as well as determine collapse "zones" in the event of catastrophic failure of the structure. Audio and visual alarms can then be activated immediately upon the determination that the position of the monitored structure has changed past acceptable limits.

An advantage of the present invention is that structure can be monitored for movement without the need for permanent installation of equipment directly to the structure.

Another advantage of the present invention is that structure can be monitored for movements which may otherwise go unnoticed to the naked eye.

Further, a preferred embodiment of the present invention can be used to visually or audibly warn those persons nearby a potentially unsafe structure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
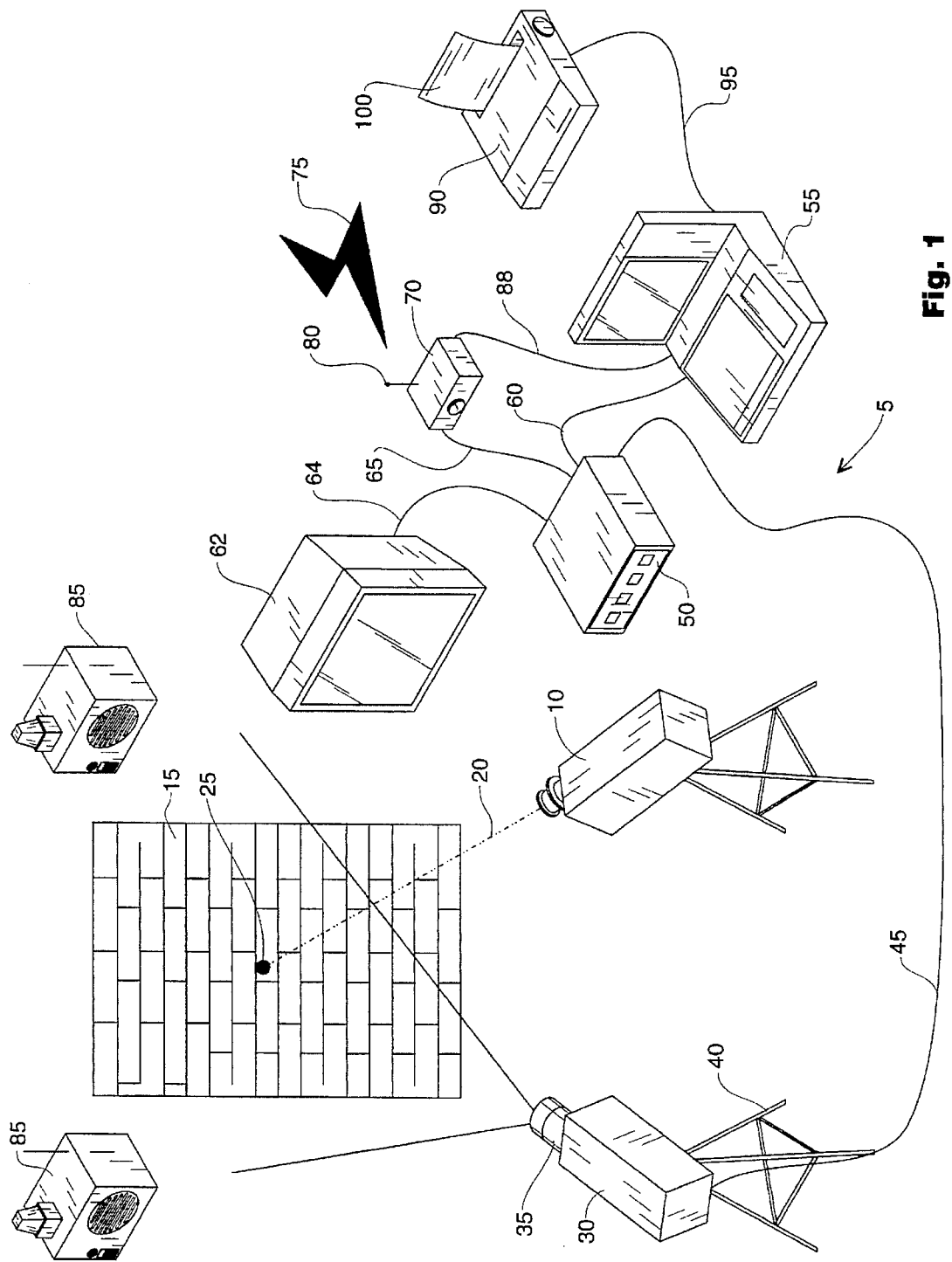
FIG. 1 is a functional descriptive diagram of a structure movement monitoring and emergency alarm system according to the preferred embodiment of the present invention.

Referring now to FIG. 1, a structure movement monitoring and emergency alarm system 5 is shown in a functional descriptive diagram according to the preferred embodiment of the present invention. A laser transit assembly 10, which will be described in greater detail below, is trained upon a wall or structure 15 in question. It is envisioned that the wall or structure 15 is under surveillance for structural integrity after a natural disaster such as an earthquake, typhoon, tornado, etc. or a man made disaster such as faulty construction, inadequate design, explosion, bombing, etc. The laser transit assembly 10 generates a laser beam 20 which produces a light spot 25 upon or adjacent to the wall or structure 15. The wall or structure 15 will move in relation to the light spot 25 when further degradation of the wall or structure 15 occurs. This movement will be observed by a high resolution video camera 30 equipped with a lens system 35 of at least 6–60 mm resolution. This will allow a total field of view of 80 feet. It is presently envisioned that changes is lenses can provide differing resolution dependent upon the particular needs of the user. Additional qualities of the high resolution video camera 30 include the ability to use infrared technology for night use, the ability to change sensitivity settings to different levels, weather proof, and slow scan capability. The high resolution video camera 30 and lens system 35 would be mounted upon a video tripod 40. A video signal cable 45 would carry electrical video images to a video motion analyzer 50. The video motion analyzer 50 is capable of "grabbing" a video image and converting to a format which can be readily stored in a computer 55. This altered format is provided to the computer 55 on a computer graphic input cable 60. The video motion analyzer 50 would convert a video image into a computer image on a regulated time interval on the order of every five to ten seconds. The video motion analyzer 50 also provides a "live" video picture to a high resolution video monitor 62 via a video monitor cable 64. The high resolution video monitor 62 is used in aiming of the high resolution video camera 30 as well as providing a means of visual inspection of the wall or structure 15 from a distance in areas of interest such as cracks or supporting structural members. Additional capabilities and the program requirements of the computer 55 will be described in greater detail below. The video motion analyzer 50 is also capable of direct output of an alarm signal upon direct detection of movement of the light spot 25 beyond preset parameters via a first alarm input cable 65 to an alarm annunciator module with transmitter 70. The alarm annunciator module with transmitter 70 is used to alert rescue workers and others around the disaster site that further structural degradation is imminent. The alarm annunciator module with transmitter 70 accomplishes this via transmission of a radio wave 75 from an antenna 80. The radio wave 75 is received by a plurality of alarm reception modules 85 located around the disaster site, which provides local audible and visual warnings to all present. Additional description of the alarm reception modules 85 will be provided in greater detail below. The alarm annunciator module with transmitter 70 is also capable of receiving a second alarm input via a second alarm input cable 88 from the computer 55. This alarm input would be the result of circumstances that did not result in direct observable movement of the wall or structure 15. These circumstances could be slow movement of the wall or structure 15 over a long period of time, weather or wind patterns that would pose a danger to the rescue workers or others at a disaster site, or by a direct manual input of an alarm signal to the computer 55 by an operator with a remote control unit (not shown). Finally, a computer printer 90, supplied via a computer printer cable 95, produces a printed output 100 which would allow the operator to constantly monitor the differences occurring during long operations or time lapses. Additionally, the printed output 100 would provide a written record of all structural movements. It is envisioned that all components of the structure movement monitoring and emergency alarm system 5 with the exception of the laser transit assembly 10, the high resolution video camera 30 and the alarm reception modules 85 would be installed in an enclosure 105 (not shown for clarity) that would be rugged, weatherproof and provide for pre-connection of all components and suitable for ease of transport to an emergency site and also lend itself to a quick setup to allow for immediate use. The enclosure 105 would be equipped with a self contained power supply (not shown) such as a small gasoline powered generator or a rechargeable battery pack to allow for use at such sites where AC power is not readily available and provide power to all components of the invention with the exception of the alarm reception modules 85.

Figure 2:
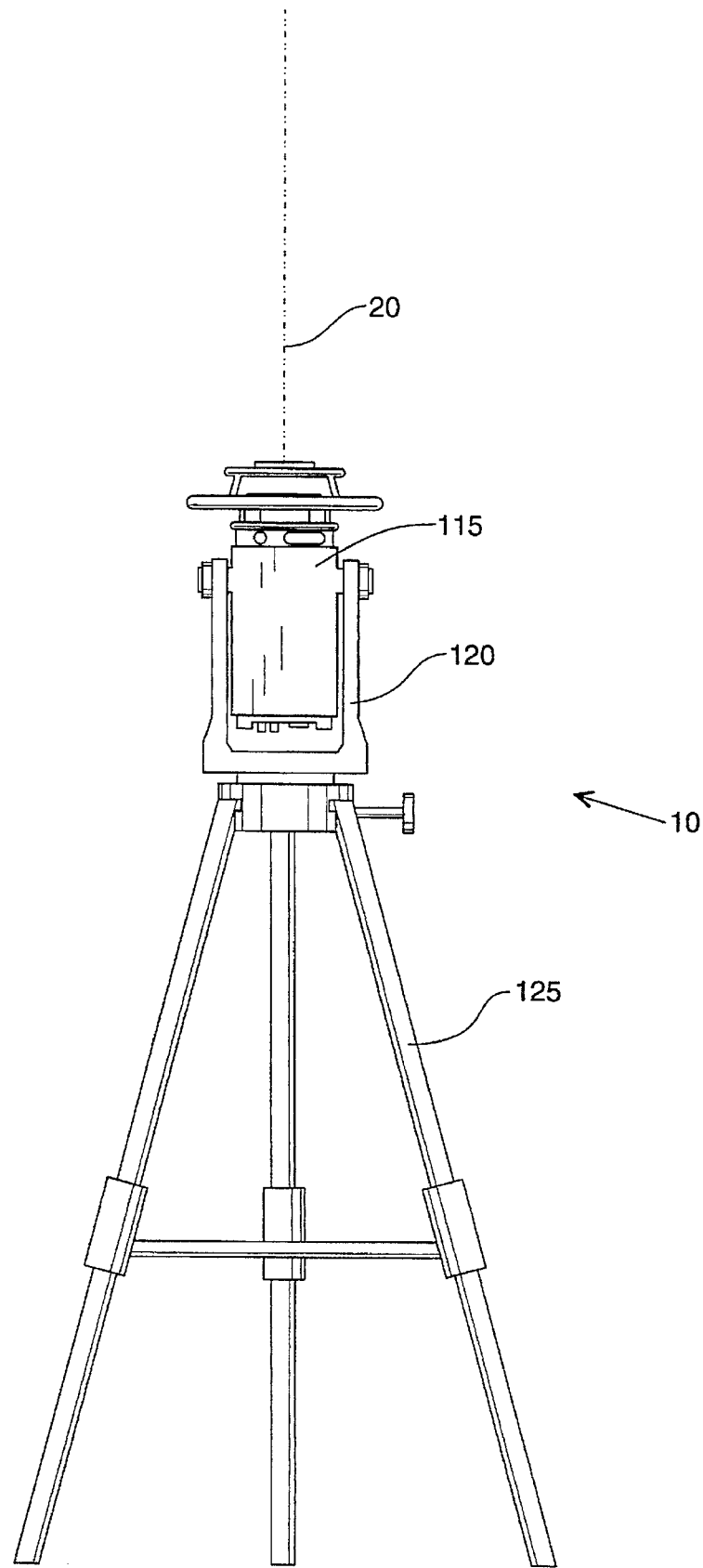
FIG. 2 is a detailed functional view of the laser transit assembly.

Referring now to FIG. 2, a detailed functional view of the laser transit assembly 10 is disclosed. A laser module 115, similar to laser transits used in construction trades is mounted in a cradle assembly 120 which is capable of being locked at any angle. The cradle assembly 120 is then mounted atop a surveyor's transit tripod 125 which provides a stable platform for the laser module 115 to produce the laser beam 20 and perform its function as outlined above.

Figure 3:
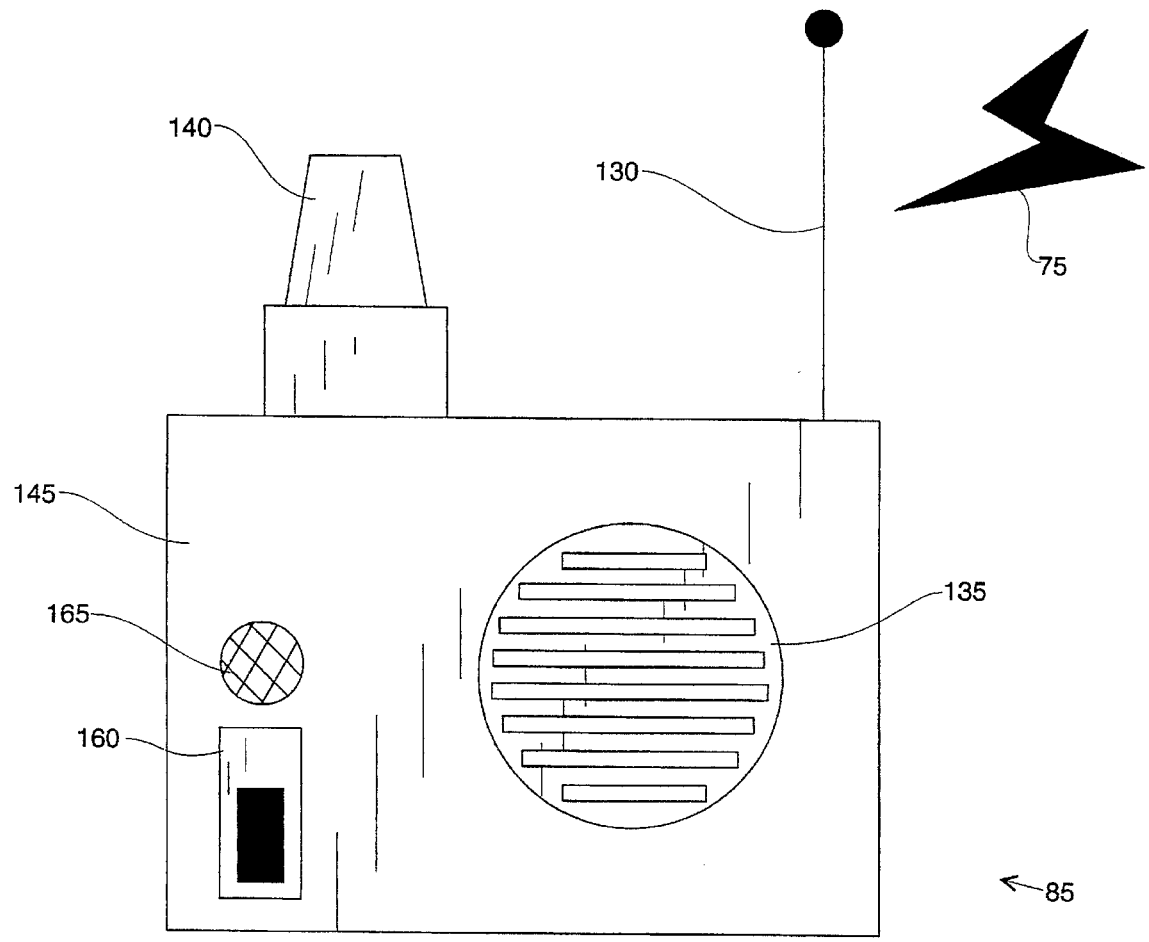
FIG. 3 is a detailed functional view of the alarm reception modules.

Referring next to FIG. 3, a detailed functional view of a typical alarm reception module 85 is disclosed. Upon reception of the radio wave 75 via the receiving antenna 130, an audible annunciation means 135, such as a loudspeaker or siren and a visual annunciation means 140 such as a strobe light or rotating beacon, produce annunciation to warn rescue workers or others at a disaster site. The receiving antenna 130, the audible annunciation means 135 and the visual annunciation means 140 are mounted externally on a housing 145. Mounted internally to the housing 145 is a radio receiver 150 (not shown) and a rechargeable power supply 155 (not shown). Providing control and status of the alarm reception modules 85 is a power switch 160 and a status light 165 respectively.

Figure 4:
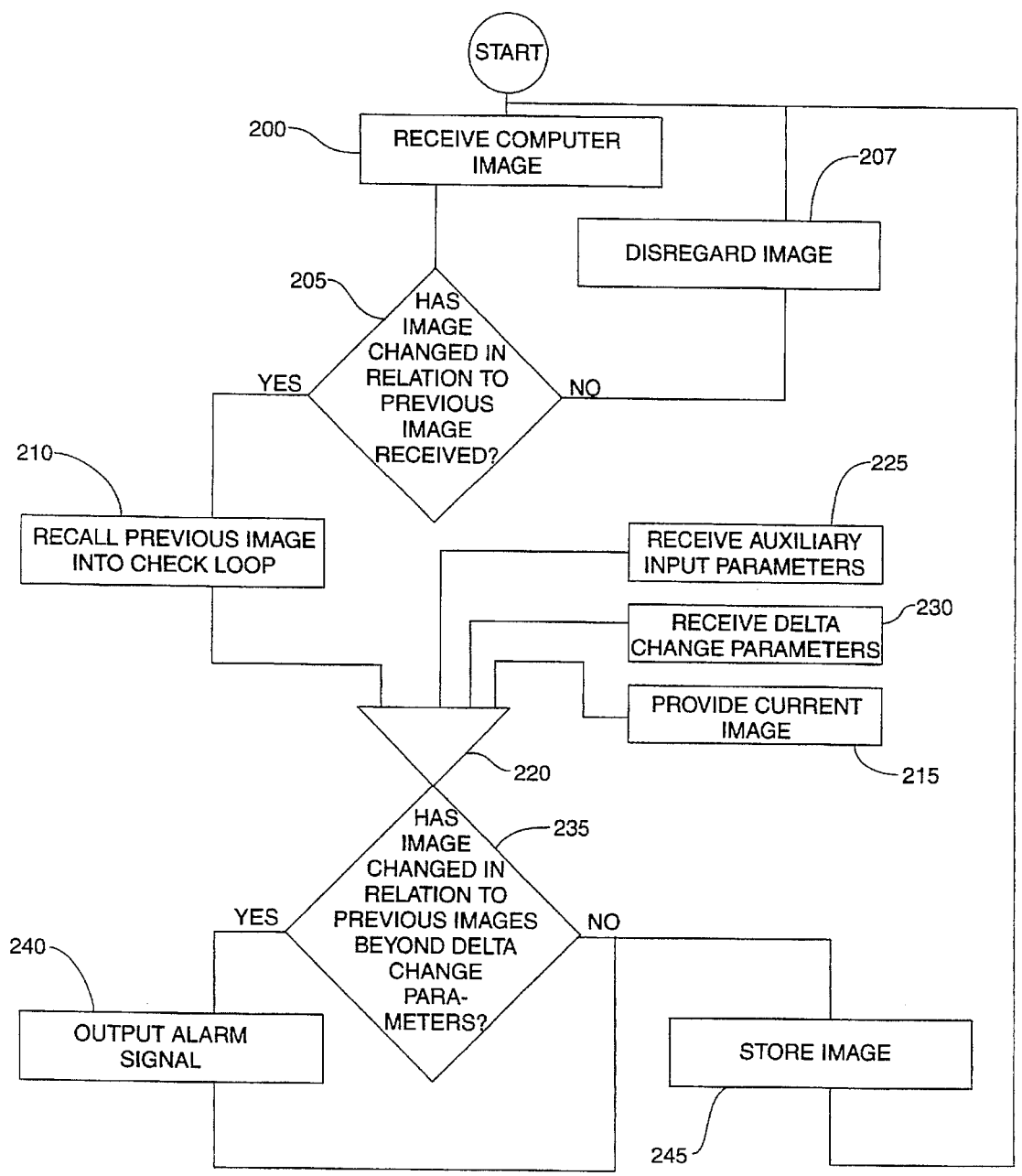
FIG. 4 is a flow chart diagram showing the methodology of the computer program used in the present invention.

Referring finally to FIG. 4, a flow chart diagram showing the methodology of the computer program used in the computer 55 as part of the structure movement monitoring and emergency alarm system 5 is disclosed. The functions and methodology shown in FIG. 3 can be implemented as subroutines in a program stored in the computer 55 (as shown in FIG. 1). At a block 200, the sequence of monitoring begins by the reception of a computer image from the video motion analyzer 50 (not shown). At an inquiry block 205 the sequence compares the computer image to the previous image received and returns to the beginning state via a loop through a block 207 which deletes the current image upon a negative outcome. If a positive answer is received at the inquiry block 205, the sequence continues by the retrieval of the last computer image at a block 210. This previous computer image at the block 210 as well as the current computer image, reproduced at a block 215 is then compared at a comparator block 220. Additional inputs to the comparator block 220 include a block 225, which inputs such parameters as weather and wind conditions or building construction information and a block 230 which provide delta change parameters which represent acceptable movement of the wall or structure 15 (not shown). The block 230 provides direct output to an inquiry block 235 to determine if structural changes are of an emergency nature. A positive output directs a block 240 to produce an alarm signal through the computer printer 90 (not shown), then store the image in computer memory at a block 245 and return to the initial state. A negative output of the inquiry block 235 directs the computer image to be stored at the block 245 and return to the initial state. The entire process of a positive outcome of inquiry block 205 is repeated for each previous stored image (not shown) such that structural differences are being compared to each previous image back to the beginning of the image storing process.

2. Operation of the Preferred Embodiment

In operation, the present invention can be utilized by the common user in a simple and effortless manner after a minimal amount of training. To use the present invention with its preferred embodiment can best be described in conjunction with the functional descriptive diagram of FIG. 1. and the flow chart diagram showing the methodology of the computer program used in the present invention of FIG. 4.

Upon notification of a natural or manmade disaster which impacts the structural integrity of building, bridges or other such large structures, the structure movement monitoring and emergency alarm system 5 would be deployed to the disaster site in the quickest manner possible along with a skilled operator or operators. Upon arrival at the disaster site, the laser transit assembly 10 would be set up and the laser beam 20 would be trained upon the structure in a location in most danger of collapsing. The high resolution video camera 30 would also be trained upon this same location such that the light spot 25 would be visible to the operator in the high resolution video monitor 62. The physical location of the laser transit assembly 10 and high resolution video camera 30 is not critical due to the fact that only relative motion of the wall or structure 15 is desired. The alarm reception modules 85 would then be placed around the disaster site in critical locations such as where rescue workers or demolition teams are working. Finally, after initialization of the computer 55 and its associated program setup is complete and operation of the structure movement monitoring and emergency alarm system 5 from this point forward can be completely automatic, freeing the operator to perform other rescue functions, or the operator may adjust parameters of the structure movement monitoring and emergency alarm system 5 and input additional parameters to the computer 55 such as weather and wind conditions or building construction information to aid in locating trapped individuals and the best path to use in the rescue of these trapped individuals.

The foregoing description is included to illustrate the operation of the preferred embodiment and is not meant to limit the scope of the invention. The scope of the invention is to be limited only by the following claims.

What is claimed is:

1. A structure movement monitoring and emergency alarm system for surveying a wall or other structure for structural integrity, said system comprising:

a laser transit assembly for generating a laser beam which produces a light spot upon or adjacent to the wall or other structure being monitored such that said wall or structure will move in relation to said light spot when further degradation of the wall or structure occurs;

a high resolution video camera for monitoring the movement of said wall and said light spot in relation to said wall or structure, said video camera further being capable of withstanding outdoor use;

a video motion analyzer capable of "grabbing" a video image and converting to a format which can be readily stored in a computer;

a video signal cable for carrying electrical video images from said video camera to said video motion analyzer; and a computer for receiving said converted video images from said video motion analyzer, for analyzing said converted images and for determining differential movement between said wall or structure and said light spot in said converted images from said video motion analyzer, said computer being in communication with said video motion analyzer via a computer graphics input cable and alarm means for alerting rescue workers and others around the disaster site that futher structural degradation is imminent and for audibly or visually indicating any movement in the monitored wall or structure.

2. The structure movement monitoring and emergency alarm system as described in claim 1, wherein said laser transit assembly is provided of the type similar to laser transits used in construction trades comprising:

a laser module for producing said laser beam;

a mounting cradle assembly for holding said laser module which is capable of being locked at any angle; and a surveyor's transit tripod for providing a stable platform for the laser module.

3. The structure movement monitoring and emergency alarm system as described in claim 1, wherein said high resolution video camera is further equipped with a lens system of at least 6–60 mm resolution such that a total field of view of 80 feet is attainable.

4. The structure movement monitoring and emergency alarm system as described in claim 1, wherein said high resolution video camera includes the ability to use infrared technology for night use.

5. The structure movement monitoring and emergency alarm system as described in claim 1, wherein said high resolution video camera further includes the ability to change sensitivity settings to different levels.

6. The structure movement monitoring and emergency alarm system as described in claim 1, wherein said high resolution video camera further includes slow scan capability to allow for predetermined panning of the camera's direction.

7. The structure movement monitoring and emergency alarm system as described in claim 1, further comprising a tripod for mounting said high resolution video camera.

8. The structure movement monitoring and emergency alarm system as described in claim 1, wherein said alarm means comprises:

said video motion analyzer being further capable of direct output of an alarm signal upon direct detection of movement of the wall or the light spot beyond preset parameters via a first alarm input cable;

an alarm annunciator module with transmitter in communication with said first alarm input cable for transmitting an alarm signal to a remote, wireless location; and an alarm reception module for receiving said alarm signal from said alarm annunciator module and transmitter and providing an audible alarm.

9. The structure movement monitoring and emergency alarm system as described in claim 1, wherein said video motion analyzer further can convert a video image into a computer image on a regulated time interval on the order of every five to ten seconds.

10. The structure movement monitoring and emergency alarm system as described in claim 1, further comprising:

said video motion analyzer further providing a "live" video picture;

a high resolution video monitor for displaying said "live" video picture, said monitor for aiming of the high resolution video camera as well as providing a means of visual inspection of the wall or structure from a distance in areas of interest such as cracks or supporting structural members; and a video monitor cable in communication between said video motion analyzer and said video monitor.

11. A method of structure movement monitoring and emergency alarming comprising the steps:

a. generating a light spot upon the wall or other structure being monitored such that said wall or structure will move in relation to said light spot when further degradation of the wall or structure occurs;

b. monitoring the movement of said wall and said light spot in relation to said wall or structure with a video camera;

c. converting a video image from said video camera into a plurality of consecutive stationary images of a format which can be readily stored in a computer;

d. consecutively comparing each successive stationary image to each preceding stationary image; and e. producing an alarm signal upon determination that differential movement between said structure and said light spot exceeds a predetermined tolerable amount.

12. In a structure movement monitoring and emergency alarm system for surveying a wall or other structure for structural integrity having a laser transit assembly for generating a laser beam which produces a light spot upon the wall or other structure being monitored such that said wall or structure will move in relation to said light spot when further degradation of the wall or structure occurs, wherein the improvement comprises:

a high resolution video camera for monitoring the movement of said wall and said light spot in relation to said wall or structure, said video camera further being capable of withstanding outdoor use;

a video motion analyzer capable of "grabbing" a video image and converting to a format which can be readily stored in a computer;

a video signal cable for carrying electrical video images from said video camera to said video motion analyzer;

a computer for receiving said converted video images from said video motion analyzer, for analyzing said converted images and for determining differential movement between said wall or structure and said light spot in said converted images from said video motion analyzer, said computer being in communication with said video motion analyzer via a computer graphics input cable; and alarm means for alerting rescue workers and others around the disaster site that further structural degradation is imminent and for audibly or visually indicating any movement in said monitored wall or structure.

\* \* \* \* \*